United States Patent [19]

Heep et al.

[11] Patent Number: 5,295,156
[45] Date of Patent: Mar. 15, 1994

[54] MODEM

[76] Inventors: Jerry J. Heep, 111 Wildflower Trail, Weatherford, Tex. 76087; Stephen S. Mosher, 2804 Ryan Place Dr., Fort Worth, Tex. 76110

[21] Appl. No.: 745,014

[22] Filed: Aug. 14, 1991

[51] Int. Cl.$^5$ .......................... H04B 1/38; H04L 5/16
[52] U.S. Cl. ........................................ 375/8; 379/98
[58] Field of Search ................ 375/8; 379/93, 94, 98; 370/24, 29, 30

[56] References Cited

U.S. PATENT DOCUMENTS

| | | | |
|---|---|---|---|
| 4,549,302 | 10/1985 | Heatherington | 379/97 X |
| 4,782,498 | 11/1988 | Copeland, III | 375/8 |
| 4,852,045 | 7/1989 | Kraul et al. | 364/900 |
| 4,926,448 | 5/1990 | Kraul et al. | 375/121 |
| 4,928,305 | 5/1990 | Yui | 375/98 |
| 5,012,489 | 4/1991 | Burton et al. | 375/8 |
| 5,107,518 | 4/1992 | Petty, Jr. | 375/8 |

OTHER PUBLICATIONS

Wakerly, J., *Reference Data for Engineers: Radio, Electronics, Computer, and Communications*, Seventh Edition, 1986, pp. 42-10 and 42-11.
Fairchild, *User's Manual, UA212TK Designers Kit*, 1986.

Primary Examiner—Stephen Chin
Assistant Examiner—Tesfaldet Bocure
Attorney, Agent, or Firm—David L. McCombs

[57] ABSTRACT

Method and apparatus for effecting mode switching from a transmission mode to a command mode of an intelligent modem operatively coupled to a digital data device and a telephone line is disclosed. A termination of the modem's transmission mode is effected after a predetermined silent time interval in which no data is received from the device and prior to the transmission of additional data on the line. Operation of the modem switches to a buffer mode in which data sent from the device is temporarily stored instead of being transmitted on the telephone line. If the stored data is a proper escape sequence, operation of the modem switches to the command mode. If a proper escape sequence is not received, operation of the modem switches to a purge mode in which the stored data is transmitted on the telephone line. The apparatus comprises a data interface, a novel modem controller and a modem engine. The modem controller includes the data buffer for storing the data received from the digital data device when operating in the buffer mode.

23 Claims, 3 Drawing Sheets

MODEM

TECHNICAL FIELD

The invention relates to digital modulator-demodulators (modems) and particularly to an intelligent modem with improved mode switching functionality.

BACKGROUND OF THE INVENTION

A digital modulator-demodulator or "modem" is a data communications device which allows communication between digital computers or other digital data devices over voice-grade telephone lines. The modem converts digital data signals from the computer or device into a form of analog signal, discrete in time value, that is suitable for transmission over analog voice band circuits, and vice versa for incoming data signals.

Intelligent modems are available which perform functions in addition to the modulation and demodulation of data. For example, intelligent modems will accept coded signals from the user to control certain aspects of the modem's transmission or reception parameters. These coded signals comprise a standard command set such as that known as the "AT" command set, for example. An exemplary AT command is given by the instruction characters "ATS0=4" which is used to enable the automatic answer feature of the modem and select the number (in this instance four) of rings to be counted before the modem answers the telephone line. In conventional intelligent modems the coded signals are provided to the modem in what is referred to as a "command mode." When the modem is operating in the command mode, the coded signals are not transmitted over the telephone line, but are implemented internally by the modem. The command mode is distinguished from a "transmission mode" during which data transmission occurs over the telephone line. The transmission mode is also sometimes referred to as the "on-line" mode or the "transparent" mode. When the modem is operating in the transmission mode a mechanism is provided for switching the operation of the modem to the command mode for implementing command instructions, it being understood that such occurs without loss of the communications link over the telephone line. A known mode switching mechanism is to issue a predetermined sequence of escape commands referred to as an "escape sequence" during the transmission mode. In order to avoid an unintended transition into the command mode, the escape sequence is typically preceded or bounded by a silent interval of a predetermined time duration in which no data is being transmitted on the line.

The foregoing conventional mode switching mechanism has certain disadvantages. Because the escape sequence is entered during the transmission mode, the escape sequence data is unnecessarily transmitted on the telephone line to the receiving device. This results in the receipt of spurious information by the receiving device and may also initiate potentially damaging commands in the receiving device. Further, at least two separate instructions are required in order to effect a transition from the transmission mode to the command mode and execute a command.

SUMMARY OF THE INVENTION

The foregoing problems are solved and a technical advance is achieved by method and apparatus for effecting mode switching from a transmission mode to a command mode in an intelligent modem for operative coupling to a digital data device and a telephone line. In a departure from the art, a termination of the modem's transmission mode is immediately effected after a predetermined silent time interval in which no data is received from the device. The termination occurs prior to any transmission of additional communications data, escape command data or modem command data on the telephone line. A further departure from the art is that upon termination of the transmission mode, operation of the modem switches to a buffer mode. In that mode, data sent from the device is temporarily stored instead of being transmitted on the telephone line. If the data stored during the buffer mode represents the proper escape sequence, operation of the modem switches to the command mode. Modem commands sent from the device are then implemented in the command mode. If the escape sequence is not received from the device during the buffer mode, operation of the modem switches to a purge mode. In the purge mode, data stored during the buffer mode is transmitted on the telephone line. Operation of the modem then returns to the transmission mode.

In one illustrative embodiment of the invention, the apparatus comprises a data interface, a modem controller and a modem engine. In addition to well known components, the modem controller includes a special data buffer for storing the data received from the digital data device upon termination of the transmission mode. The digital data device is connected through the data interface to both the modem engine and to the modem controller. A transmit switch is operable by the controller between first and second positions. In the first position, the modem engine receives data directly from the data device. In the second position, data is received by the modem engine from the buffer. A receive switch is also operable by the controller between first and second positions. In the first position, data is sent from the telephone line through the modem engine to the data device. In the second position, the data originally sent to the controller by the device is echoed back to the device from the controller.

The apparatus operates in the transmission mode when the transmit and receive switches are in their first positions. The controller monitors data transfer and if a predetermined silent time interval elapses, the controller effects a termination of the transmission mode by switching the receive switch to the second position and disabling the analog output of the modem engine, before additional data is sent. The apparatus is now operating in the buffer mode in which data from the device is stored in the buffer. If the escape sequence is entered, the controller transfers operation to the command mode without changing the switch positions. The commands may then be executed by the controller and echoed back to the data device. If the escape sequence is not entered, the controller transfers operation to the purge mode by switching the transmit switch to the second position. Data in the buffer is transmitted on the telephone line since it is not the escape sequence and is likely to be valid data. The apparatus accomplishes the foregoing in a manner compatible with the industry standard.

In a preferred embodiment, the apparatus of the invention comprises means for terminating the transmission mode of a modem upon an expiration of a predetermined time interval during which no data signals are received, and means for subsequently establishing the command mode following a receipt of a predetermined sequence of data signals. The apparatus may be included as part of a chip set for incorporation into a modem product.

An important technical advantage achieved with the invention is that no data is transmitted on the telephone line in the transmission mode after elapse of the predetermined time interval. Instead, the data is temporarily stored in the buffer to determine if it is the escape sequence. This avoids the transmission of spurious characters or potentially damaging characters on the telephone line to a remote device. If the buffered data is not the escape sequence it is purged to the telephone line thereby avoiding loss of data.

An additional technical advantage achieved with the invention is improved efficiency in the execution of modem commands. After the predetermined silent time interval, a modem command may be directly entered if it is preceded by an escape command prefix. The invention eliminates the need to enter the full escape sequence and wait for confirmation from the controller before the modem command may be entered.

DESCRIPTION OF THE DRAWINGS

The novel features believed characteristic of the present invention are set forth in the appended claims. The invention itself, however, as well as other objects, features and advantages thereof will best be understood by reference to the following detailed description of an illustrative embodiment when read in conjunction with the accompanying figures, wherein:

DESCRIPTION OF THE PREFERRED EMBODIMENT

Figure 1:
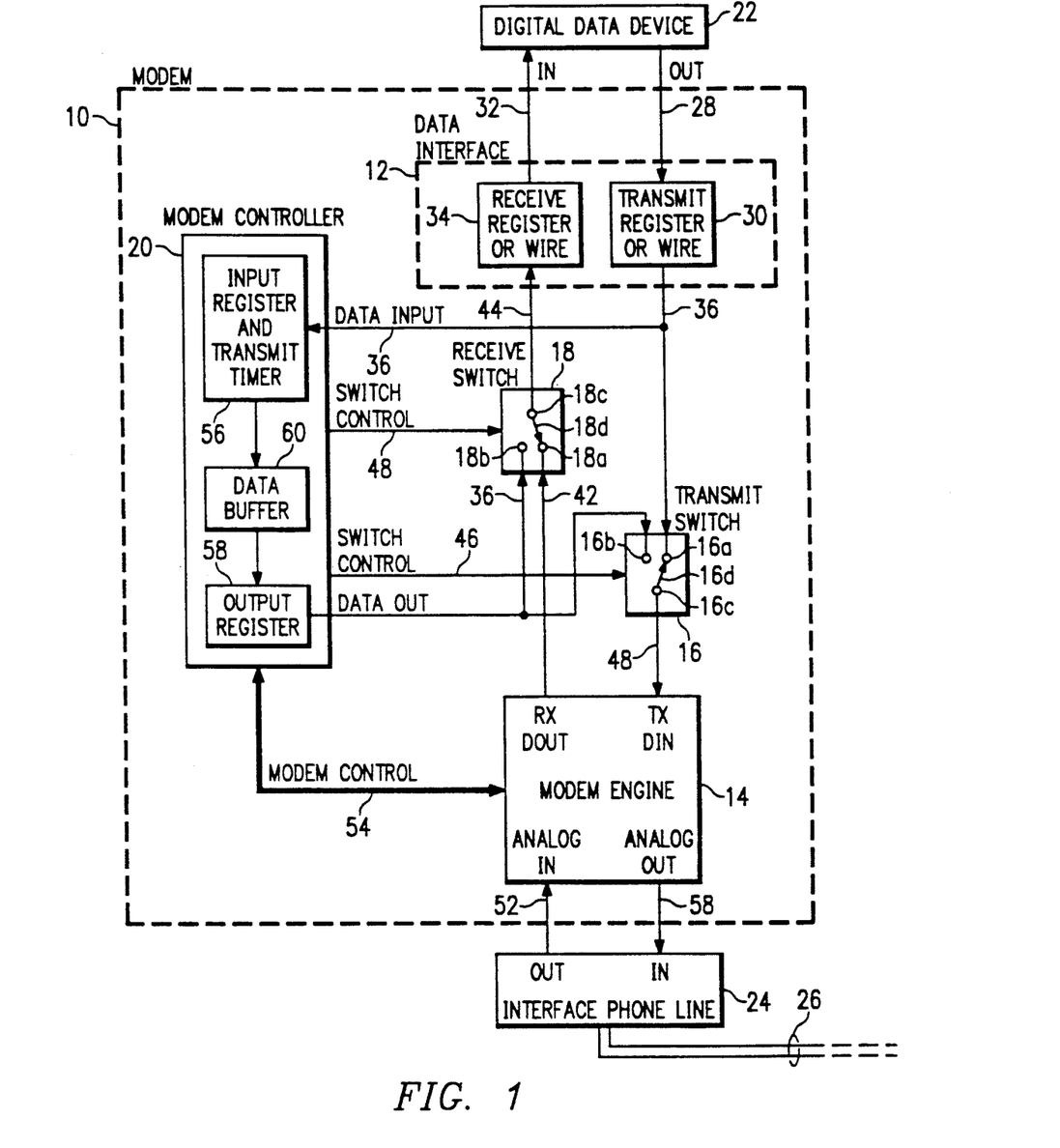
FIG. 1 is a functional block diagram of the modem of the present invention.

Referring to FIG. 1 of the drawings, the reference numeral 10 refers to a modem embodying principles of the present invention. The modem 10 includes a data interface 12, a modem engine 14, a transmit switch 16, a receive switch 18 and a modem controller 20. The modem 10 is connected between a digital data device 22 and a telephone line interface 24. A standard voice-grade telephone line 26 connects the telephone line interface 24 to a remote device (not shown) through a telecommunications network (also not shown) It is understood that the modem 10 enables data communications between the device 22 and the remote device by converting digital data sent from the device 22 into analog signals for transmission on the telephone line 26 to the remote device, and by converting analog signals on the line sent from the remote device into digital data for receipt by the digital device 22. As discussed in detail below, the modem 10 is an intelligent modem which operates in a manner to be described to implement user command instructions.

The digital data device 22 is typically a digital computer but may be any other device which sends and/or receives digital data in either a serial or parallel data format. For example, the device 22 may also be a printer or a facsimile machine. A line 28 connects the OUTPUT port of the digital data device 22 to a transmit register 30 of the data interface 12. A line 32 connects the INPUT port of the digital data device 22 to a receive register 34 of the data interface 22. The data interface 12 enables the exchange of data in a parallel data format between the modem 10 and the device 22. It is understood that if the device 22 is a serial data device, the registers 30, 34 are not required and ma be replaced with wire conductors or the like (not shown). Digital data received from the device 22 by the transmit register 30 is output on line 36 to a normally-closed lead 16a of the transmit switch 16 and also to the DATA INPUT of the modem controller 20. A line 38 connects the DATA OUTPUT of the modem controller 20 to a normally-open lead 16b cf the transmit switch 16. A line 40 connects a common lead 16c of the transmit switch 16 to the data input (DIN) of the modem engine 14. The DATA OUTPUT of the modem controller 20 is also connected by the line 38 to a normally-open lead 18b of the receive switch 18. A line 42 connects the data output (DOUT) of the modem engine 14 to a normally-closed lead 18a of the receive switch 18. A line 44 connects a common lead 18c of the receive switch 18 to the receive register 34 of the data interface 12.

Wiper arms 16d and 18d of the respective switches 16 and 18 provide electrical contact between the common leads 16c, 18c and either the normally-closed leads 16a, 18a or the normally-open leads 16b, 18b, respectively. A first switch position for each of the switches 16 and 18 is defined when the wiper arms 16d, 18d provide electrical contact between the common leads 16c, 18c and the normally-closed leads 16a, 18a, respectively. A second switch position for each of the switches is defined when the wiper arms 16d, 18d provide electrical contact between the common leads 16c, 18c and the normally-open leads 16b, 18b, respectively. Switch control lines 46 and 48 from the modem controller 20 to the respective switches 16 and 18 control the operation of the switches. It is understood that the switches 16, 18 may be implemented with standard analog or digital circuitry or alternatively may be implemented by firmware in the modem controller 20.

It will be appreciated from the above that digital data from the OUTPUT port of the device 22 is always sent to the DATA INPUT of the modem controller on the line 36 but is only sent to the modem engine 14 when the transmit switch 16 is in the first position. Data from the DATA OUTPUT of the modem controller 20 is sent on the lines 38 and 40 to the DIN of the modem engine 14 when the transmit switch 16 is in the second position. The INPUT port of the device 22 receives data from the DOUT of the modem engine 14 when the receive switch 18 is in the first position and receives data from the DATA OUTPUT of the modem controller 20 when the switch 18 is in the second position.

A line 50 connects the ANALOG OUT port of the modem engine 14 to the IN port of the line interface 24. A line 52 connects the OUT port of the line interface 24 to the ANALOG IN port of the modem engine 14. A modem control bus 54 is utilized to control the operation of the modem engine 14 by the controller 20. The control bus 54 carries control signals between the modem engine 14 and the controller 20. Such control signals may be, for example, data carrier detect, ring indicator, data transfer clock, baud rate or other well known signals. The particular control signals depend upon the control signals required by the modem engine 14.

While not shown, it is understood that the modem engine 14 comprises data modulator and demodulator circuits and other components necessary to control telephone line signaling, data communications interfacing ("handshaking") and the reception and transmission of data from the device 22. The means of construction of the modem engine 14 and the means for controlling its operation by a control device such as the modem controller 20 are well known.

The modem controller 20 is a microcomputer and includes an input register and timer block 56, an output register block 58 and a data buffer block 60. The block 56 is connected to the DATA INPUT of the controller 20 for receiving data from the transmit register 30 on the line 36. The block 56 sends data to the buffer block 60 for temporary storage, for reasons discussed below. Data output from the buffer block 60 is supplied to the output register block 58. The output register block 58 is connected to the DATA OUTPUT of the controller 20 and sends the data on the line 38 as will be subsequently described. The blocks 56, 58 and 60 are interconnected on a system bus (not shown). While also not shown, it is understood that a microprocessor, logic devices, latches, memory and other components are included in the controller 20, as necessary. It is also understood that a control bus (not shown) is connected between the device 22 and the controller 20 for carrying control signals therebetween. The architecture and design of the controller 20 will depend upon the particular control bus requirements of the device 22 and the modem engine 14. It is understood that the operation of the controller 20 may be implemented by microcode instructions (firmware) stored in the controller 20. The mean of construction and programming of the controller 20 will be apparent to one skilled in the art from the disclosure herein and the general state of the art.

The telephone line interface 24 is a standard device containing circuitry necessary to interface the analog signals from the modem engine 14 with the telephone line 26. Although not shown, it is understood that the line interface includes arrangements for pulse-dial signaling, ring detection and telephone line protection circuitry.

The operation of the modem 10 is best understood first with reference to the operation of prior art modem devices. An intelligent prior art modem (not shown) includes three basic modes of operation. The first mode is a "call answer" or "call originate" mode in which the modem either answers an incoming call on the telephone line or originates an outgoing call on the telephone line to a remote receiving device. The second mode is a "data transmission" mode in which data communication occurs between the digital data device connected to the modem and a remote device on the other end of the telephone line. The third mode of operation is a "command mode" in which instructions are given to the modem from the digital data device to perform certain functions. The functions include going off hook, dialing a particular telephone number, answering a ringing signal, changing the number of rings before answering, and other well known functions. It is appreciated that when the modem is in the command mode, the command instructions to the modem are not transmitted on the telephone line, though the telephone line may remain off hook.

A prior art modem operating in the transmission mode must provide a mechanism for switching its operation to the command mode so that commands may be executed. Typically, this is accomplished by issuing a predetermined sequence of data characters or escape commands referred to as an "escape sequence" during the transmission mode.

Figure 2A:
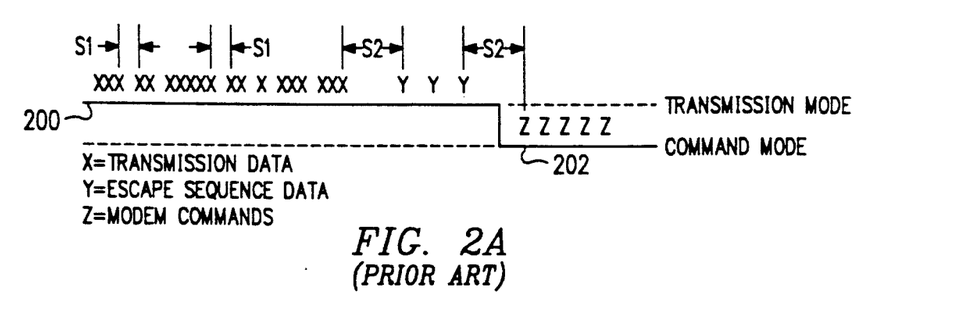
FIG. 2A is a state diagram illustrating the switching mechanism for a prior art modem for transferring from the transmission mode to the command mode, in which the transfer is successful.
Figure 2B:
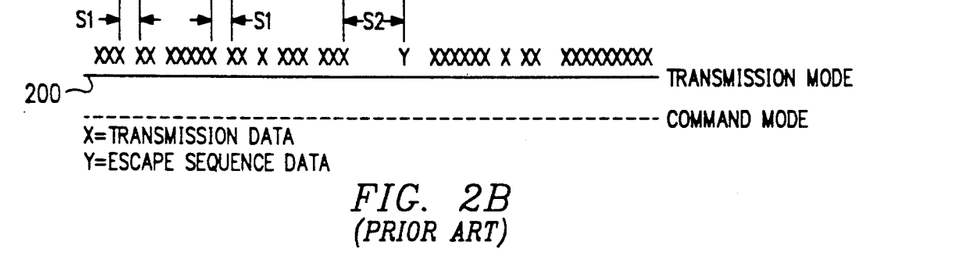
FIG. 2B is a state diagram illustrating the switching mechanism for a prior art modem for transferring from the transmission mode to the command mode, in which the transfer is unsuccessful.

FIGS. 2A and 2B are mode state diagrams plotted with respect to time for an intelligent prior art modem and illustrate a conventional mode switching mechanism for successful and unsuccessful mode switch attempts, respectively.

In FIG. 2A, line 200 represents the modem operating in the transmission mode and line 202 represents the modem operating in the command mode, plotted with respect to time, for the prior art modem. The references "X" represent digital data in the form of individual data bits or characters. The references "Y" represent escape commands in the form of individual data characters. The references "Z" represent modem commands in the form of individual data characters. The digital data characters X are transmitted serially between a data device (not shown) and the telephone line (also not shown). If the silent time interval between the transmission of the data characters X is relatively short, as represented by the time reference "S1," the modem will detect the transmission of the data characters X, however no examination of the content of the data will occur by the modem. If the time period between the transmission of the data characters X meets or exceeds a predetermined time period represented by the reference "S2," the modem examines the data being transmitted in order to determine whether the data is an escape command character Y. The modem determines whether the escape command data character Y defines the predetermined escape sequence. In FIG. 2A, the defined escape sequence is give by three successive data characters "YYY" with the time interval therebetween less than the time interval S2. Since the defined escape sequence is preceded by the time interval S2 a mode switch occurs to the command mode. It is understood that the escape command data characters Y were transmitted on the telephone line to the receiving device since they were sent during the transmission mode. Once in the command mode, the modem commands represented by the characters Z are sent from the device to the modem. The modem commands occur directly between the external data device and the modem and are not transmitted on the telephone line. However, it will be appreciated that the escape command characters Y were transmitted on the telephone line to the receiving device because they occurred during the transmission mode.

FIG. 2B illustrates an unsuccessful attempt to switch from the transmission mode to the command mode for a prior art modem device. A single escape command character Y is sent by the data device to the modem during the transmission mode. Although a sufficient silent time interval S2 has elapsed prior to the transmission of the escape command character Y, the escape command character Y is not followed by the necessary additional escape command characters YY, within a time interval less than S2, so as to define the required escape sequence. Accordingly, operation of the modem remains in the transmission mode and a spurious character in the form of the escape command character Y is transmitted to the receiving device.

Figure 3A:
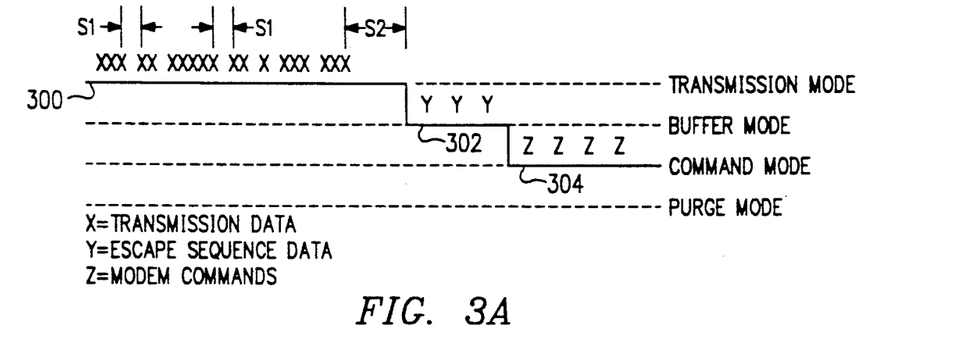
FIG. 3A is a state diagram illustrating the switching mechanism for the modem of the present invention for transferring from the transmission mode to the command mode, in which the transfer is successful.
Figure 3B:
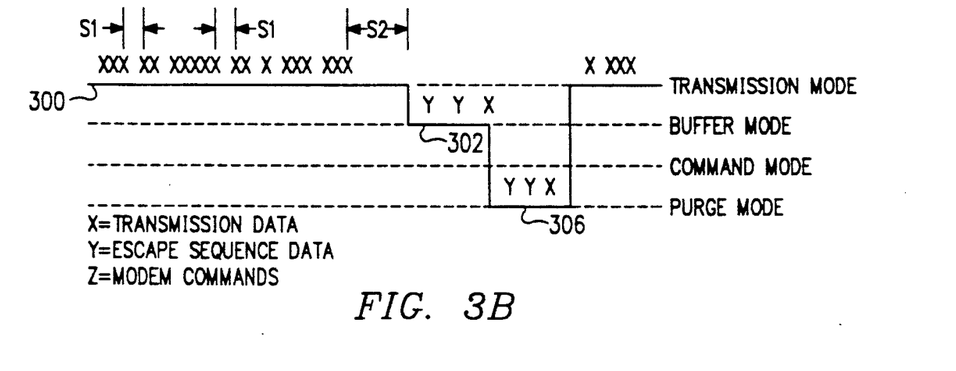
FIG. 3B is a state diagram illustrating the switching mechanism for the modem of the present invention for transferring from the transmission mode to the command mode, in which the transfer is unsuccessful.

The operation of the modem 10 of the present invention will now be described with reference to FIG. 1 and FIGS. 3A and 3B. FIGS. 3A and 3B are mode state diagrams plotted with respect to time for the modem 10 and illustrate the mode switching techniques of the present invention for successful and unsuccessful mode switch attempts, respectively.

In both FIGS. 3A and 3B, line 300 represents the operation of the modem 10 in the transmission mode state. As discussed above, the transmission mode defines the condition in which data communications occur through the modem between the digital device 22 and the telephone line 26. The references "X" represent the digital data in the form of individual data characters. A line 302 represents the operation of the modem 10 in a special "buffer mode." In the buffer mode, data characters are temporarily stored in the data buffer 60 of the modem controller 20 (FIG. 1), for reasons described below. The references "Y" represent escape commands in the form of individual data characters. A line 304 represents the state in which the modem 10 is operating in the command mode. As previously discussed, the command mode defines the condition in which instructions are given to the modem from the device 22 to perform certain intelligent functions. The references "Z" represent modem commands in the form of individual data characters. A line 306 (FIG. 3B) represents the operation of the modem 10 in a special "purge" mode. When operating in the purge mode, the modem 10 transfers data characters from the data buffer 60 (FIG. 1) to the modem engine 14 for transmission on the telephone line 16. The purge mode is discussed in detail below.

Referring to FIGS. 1 and 3A, the modem 10 is assumed to be operating in the transmission mode for the purpose of transmitting digital data, represented by the individual data characters X, from the device 22 to the telephone line 26. While not shown, a remote receiving device is poised to receive the data through a telecommunications network on the other end of the line 26. The digital data is sent through the OUTPUT port of the digital device 22 on the line 28 to the transmit register 30 of the data interface 12. The transmit register converts the data from parallel to serial form, if necessary, and outputs the data on the line 36 to both the transmit switch 16 and the DATA INPUT of the modem controller 20. The modem controller 20 monitors the transmission of data and keeps track of the time interval between characters using the transmit timer portion of the block 56. The transmit switch is in the first position and passes the data on the line 40 to the DIN of the modem engine 14. The modem engine 14 converts the data from digital to analog form and supplies it through the ANALOG OUT port to the IN port of the line interface 24. The data is output from the line interface in a conventional manner to the telephone line 26 and to the remote device (not shown).

Conversely, it is understood that data may be transmitted from the remote device through the telephone line 26 to the device 22 through the modem 10. Analog data received by the line interface 24 is sent from the line interface OUTPUT port to the ANALOG IN port of the modem engine 14. The modem engine 14 converts the analog data to digital data and sends the data from the DOUT on the line 42 to the receive switch 18. The receive switch 18 is in the first position and therefore passes the data on the line 44 to the receive register 34. The receive register 34 converts the data to parallel form, if necessary, and sends it on the line 32 to the data device 22 through the INPUT port.

As mentioned above, the block 56 of the modem controller 20 monitors the time intervals between the data characters sent from the device to the modem 1 during the transmission mode. If the silent time interval between the transmission of the characters X (FIG. 3A) is sufficiently brief, as represented by the reference "S1," operation of the modem 10 remains in the transmission mode.

If the silent time interval between the transmission of characters meets a predetermined time interval, represented by the reference "S2," operation of the modem 10 is switched to the buffer mode. The modem controller 20 effects the termination of the transmission mode, and the transition to the buffer mode, by sending a signal on the switch control line 48 to switch the receive switch 18 from the first position to the second position. With the switch 18 in the second position, data from the output register 58 is sent through the DATA OUT of the controller 20 on the lines 38 and 44 to the device 22 through the switch 18 and the data interface 12. The foregoing enables "echoing" of escape commands Y back to the device 22. Data is no longer capable of being sent from the modem engine 14 to the device 22 with the switch 18 in the second position. Data is also no longer capable of being sent from the device 22 to the line interface 24 through the modem engine 14. Even though the transmit switch 16 remains in the first position, the modem controller 20 provides a signal on the control bus 54 to the modem engine 14 to inactivate the modem engine from sending out data on the ANALOG OUT port. One skilled in the art will appreciate that instead of inactivating the modem engine 14, an additional switch (not shown) may be provided on the line 40 to accomplish this result in an alternative embodiment.

In the buffer mode, shown by the line 302, the switch 18 is in the second position, the switch 16 is in the first position, and the modem engine is inactivated, as discussed above. Data now received by the modem controller 20 from the device 22 is converted by the input register of the block 56, as necessary, and is temporarily stored in the data buffer 60. The data buffer 60 holds a discrete number of characters and is used as a first-in, first-out (FIFO) memory device between the registers of blocks 56 and 58. The controller 20 monitors the contents of the data it receives when in the buffer mode. The controller 20 determines whether the buffer 60 contains a proper escape sequence of escape command characters Y. As shown in FIG. 3A, if the buffer contains the escape sequence represented by the characters "YYY" (received with a time interval between them of less than S2), the controller 20 recognizes this as the proper escape sequence. Operation of the modem 10 switches to the command mode shown by the line 304. No additional switching of the switches 16 or 18 is required to implement the command mode.

In the command mode shown by the line 304, the device 22 communicates with the modem controller 20 exclusively and no data is transmitted to the telephone line 26. The commands represented by the characters Z are implemented by the controller 20 to perform the desired command functions. The modem controller 20 returns operation of the modem 10 to the transmission mode upon receipt of the appropriate command. To effect the switch to the transmission mode, the controller 20 reactivates the modem engine 14 and returns the receive switch 18 to the first position.

Referring to FIGS. 1 and 3B, operation of the modem 10 is described when the proper escape sequence is not provided after the silent interval S2 in order to effect a transfer of operation from the buffer mode to the command mode. As mentioned above, the controller 20 monitors the data characters received in the buffer 60 to determine if the proper escape sequence is present. If the escape sequence is not received, operation of the modem 10 is switched by the controller 20 to the purge mode represented by the line 306. The purpose of the purge mode is to transmit the data in the buffer 60 to the modem engine 14 for transmission on the line 26. This is necessary because if the characters received in the buffer 60 are not the escape sequence, they ar most likely data characters which were intended to be transmitted on the line 26 during the transmission mode, but were received by the modem 10 from the device 20 after the predetermined time interval S2. In order to prevent loss of this data and enable its transmission, operation of the modem 10 switches to the purge mode.

In order to effect the transition from the buffer mode to the purge mode, the transmit switch 16 is switched to the second position by the controller 20 using the switch control line 46. The modem engine 14 is again enabled by the controller through an activation signal on the control bus 54. Data in the buffer 60 is sent through the output register 58 on the DATA OUT on the line 38. The data passes through the transmit switch 18 and on the line 40 to the DIN of the modem engine 14. The modem engine 14 converts the data to analog form and sends it on the ANALOG OUT port to the line interface on the line 50 for transmission on the telephone line 26.

Once the data in the buffer 60 is transmitted on the telephone line 26 during the purge mode, the modem controller switches the operation of the modem 10 to the transmission mode, as shown in FIG. 3B, by returning both of the switches 16 and 18 to their first positions.

Figure 4:
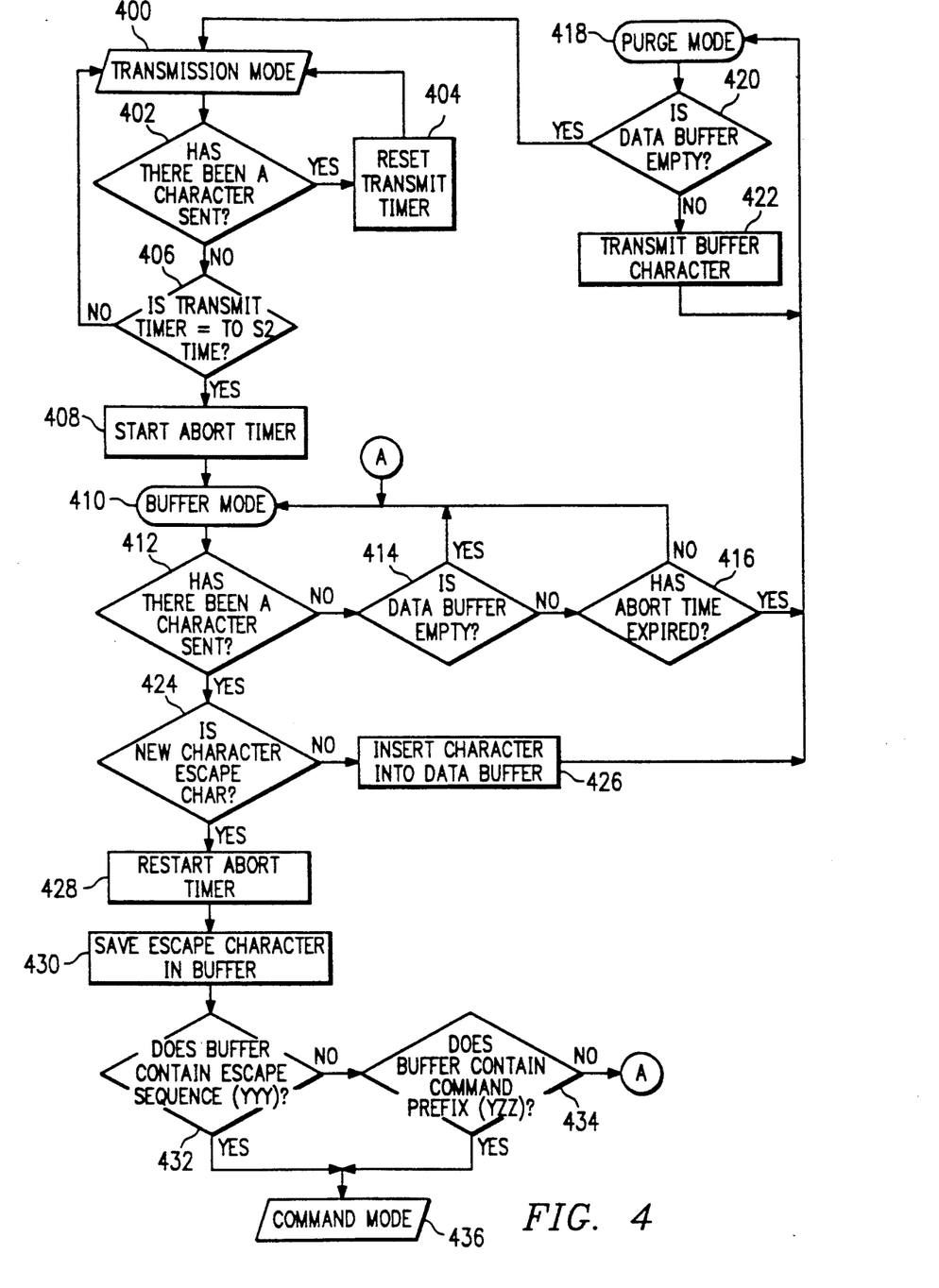
FIG. 4 is a flow chart illustrating the logic for implementing the mode switching technique of the present invention.

FIG. 4 is a flow chart illustrating control logic for operating the modem 10 in accordance with the present invention. It is understood that the logic may be implemented by microcode instructions contained within the modem controller 20.

In step 400, the modem 10 operates in the transmission mode to transmit data between the data device 22 and the telephone interface 24, as previously described. The modem controller 20 sets its transmit timer as each character is received by the controller 20 from the digital data device 22. In step 402, a decision is made whether a character has been sent from the device 22 to the controller 20. If a data bit has been sent, step 404 resets the transmit time and control returns to step 400. If in step 402 it is determined that no character has been sent, a determination is made in step 406 whether the transmit timer setting is equal to the predetermined time S2. If the timer setting is not equal to S2, control returns to step 400 and operation continues in the transmission mode as discussed above. If in step 406 the timer setting is equal to S2, step 408 initializes an abort timer. The abort timer measures the time interval between escape command bits Y received by the modem controller 20 while in the buffer mode.

In step 410, the modem controller switches operation of the modem 10 from the transmission mode to the buffer mode. In step 412, a determination is made whether a character has been sent to the modem controller 20 from the device 22 for storage in the data buffer 60. If no character has been sent in step 412, a determination is made in step 414 to determine whether the data buffer 60 is empty. If the data buffer 60 is empty in step 414, control returns to step 410 and operation of the modem 10 continues in the buffer mode. If in step 414 the buffer is not empty, a decision is made in step 416 to determine whether the abort time of the abort timer has expired. If the abort time has not expired in step 416, control proceeds again to step 410 and operation continues in the buffer mode.

If the abort time has expired at step 416, control proceeds to the purge mode in step 418. The purge mode operates to empty the buffer 60 of characters not intended as escape sequence commands and transmit such data to the telephone interface. In step 420, a decision is made whether the buffer 60 is empty. If the buffer 60 is not empty in step 420, control proceeds to step 422 and the buffer characters are transmitted from the buffer 60 to the telephone line interface 24. Control returns from step 422 to step 412. If the command buffer is empty in step 420, control returns to step 400 and operation is resumed in the transmission mode.

Returning to the discussion of the buffer mode in step 412, if a character has been sent from the data device 22 to the modem controller 20, control proceeds to step 424. In step 424, a decision is made whether the new character is an escape command character Y. If not, in step 426 the character is inserted into the buffer and control proceeds to the purge mode at step 418, discussed above. If in step 424 the new character is an escape command character, control proceeds to step 428 to restart the abort timer. In step 430, the escape command character is stored in the buffer 60. In step 432, a decision is made whether the buffer 60 contains the proper predetermined escape sequence (YYY). If the escape sequence is not contained in the buffer 60 at step 432, a decision is made in step 434 whether the buffer contains a modem command prefix. If a modem command prefix is not present in the buffer in step 434, control returns to step 410 and operation proceeds in the buffer mode as discussed above. If a command prefix is contained in the buffer at step 434, control proceeds to step 436 and operation of the modem is switched to the command mode. If a command was entered following the command prefix contained in the buffer in step 434, the modem controller 20 will execute the command automatically. In step 432, if the buffer contains the predetermined escape sequence, control proceeds to step 436 and operation is switched to the command mode. Once in the command mode from step 432, a command may then be entered to execute a desired command function after receiving a return signal from the modem. For example, the return signal may be the characters "OK" and indicate that a command instruction may now be entered. It is appreciated that if a command prefix is contained in the buffer in step 434 followed by a command instruction, the user has saved a step in executing a command in the command mode.

As compared with the entry of the escape sequence in step 432, the user does not need to wait for a return signal (such as "OK") from the modem as a confirmation prior to entering the desired command. In step 434, the command prefix is sufficient to place the operation of the modem in the command mode. Entry of the command along with the command prefix, followed by a single return stroke, is sufficient to execute the command by the user.

It is understood that variations may be made in the present invention without departing from the spirit and scope of the invention. For example, the modem 10 may be alternatively configured so that the data interface and the modem controller are integrated into a single device, or the data interface may be eliminated altogether if the modem is intended for use only with serial data devices. Further, it will be appreciated that the entire modem may be embodied as a single integrated circuit chip, or any varying combination of discrete digital or analog components interconnected in a standard manner. The telephone interface may also be incorporated as part of the modem. Likewise, the modem itself may be incorporated with the data device or a telephone.

Although illustrative embodiments of the invention have been shown and described, a latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of operating a modem having an input for receiving data signals and an output for transmitting data signals to a remote device, and being operative in a command mode in which said modem responds to data signals received at said input for implementing modem command instructions, the method comprising:
    establishing said command mode in response to a receipt of a predetermined sequence of said data signals received at said input following a prior expiration of a predetermined time interval in which no said data signals are received at said input; and
    interrupting a transmission to said output of said data signals received at said input following said expiration of said predetermined time interval, thereby preventing receipt of said predetermined sequence at said remote device.

2. A method according to claim 1 in which said modem is operative in a transmission mode in which said modem provides modulated signals to said output in response to said data signals received at said input, wherein:
    said interrupting is effected by switching said modem operation from said transmission mode upon said expiration of said predetermined time interval.

3. A method according to claim 2 further comprising:
    buffering said data signals received at said input following said switching from said transmission mode.

4. A method according to claim 3 further comprising:
    establishing said command mode when said buffered data signals define said predetermined sequence of said data signals.

5. A method according to claim 3 further comprising:
    transmitting modulated signals to said output in response to said buffered data signals when said buffered data signals are other than said predetermined sequence of said data signals.

6. A method of operating a modem having an input and an output, said modem operative in a transmission mode in which communications signals are provided to a remote device through said output in response to data signals received at said input and operative in a command mode in which modem command instructions are implemented in response to data signals received at said input, said command mode being entered upon receipt at said input of a predetermined sequence of data signals, the method comprising:
    terminating said transmission mode upon an expiration of a predetermined time interval during which no said data signals are received at said input, thereby preventing transmission of said predetermined sequence to said remote device;
    buffering said data signals received at said input following said termination of said transmission mode;
    subsequently establishing said command mode when said buffered data signals define a predetermined sequence of said data signals; and
    transmitting communications signals to said output in response to said buffered data signals when said buffered data signals are other than said predetermined sequence of said data signals.

7. A method of operating a modem having an input for receiving data signals from a sending device and an output for transmitting data signals to a remote device and also back to said sending device, and being operative in a command mode in which said modem responds to command data signals received at said input for implementing modem command instructions, said command data signals including command prefix data signals and command instruction data signals, said command instruction data signals normally being received at said input from said sending device following a return data signal transmitted to said sending device from said modem output, said return data signal being generated by said modem in response to said command prefix data signals, the method comprising:
    interrupting a transmission of said data signals to said output upon expiration of a predetermined time interval in which no data signals are received at said input;
    establishing said command mode following said predetermined time period expiration and following a receipt at said input of said command prefix data signals independent of generating at said output a subsequent return data signal; and
    executing command instruction data signals received at said input from said sending device immediately following said command prefix data signals received at said input from said sending device, thereby eliminating delay in execution of said command mode occasioned by transmitting said return data signal from said modem to said sending device.

8. A method for effecting mode switching in a modem operatively coupled to a digital data device and a telephone line, said modem operating at least in a transmission mode in which said modem provides communications signals to said line in response to data signals from said device, and in a command mode in which said modem responds to said data signals from said device as command instructions to said modem, the method comprising:

terminating said transmission mode upon the expiration of a predetermined time interval in which no said data signals are received from said device;

buffering said data signals received after the expiration of said predetermined time interval;

switching operation of said modem to said command mode when said buffered data signals define a predetermined sequence of said data signals; and     purging said buffered data signals to said line as communications signals when said buffered data signals are other than said predetermined sequence of data signals.

9. A method according to claim 8 further comprising: switching operation of said modem to said transmission mode after purging said buffered data signals.

10. A method according to claim 8 wherein: said predetermined sequence of said data signals comprises a defined escape sequence.

11. A method according to claim 8 wherein: said predetermined sequence of data signals comprises a defined command prefix.

12. A method according to claim 11 further comprising:

receiving a defined modem command following said defined command prefix.

13. A method for effecting mode switching in a modem operatively coupled to a digital data device and a telephone line, said modem operating at least in a transmission mode in which said modem provides modulated signals to said line in response to data signals from said device, and in a command mode in which said modem responds to said data signals from said device as command instructions to said modem, the method comprising:

detecting receipt of each of said data signals from said device;

resetting a timer in response to receipt of each of said data signals from said device;

terminating said transmission mode upon the elapse of a predetermined time interval measured by said timer in which no said data signals are received from said device;

initializing an abort timer upon elapse of said predetermined time interval;

buffering said data signals received after the elapse of said predetermined time interval;

determining whether each of said buffered data signals is a defined escape character;

resetting said abort timer upon receipt of each said escape character prior to elapse of a predetermined abort time;

switching operation of said modem to said command mode when said buffered data signals define a predetermined sequence of said escape characters received prior to elapse of said abort timer; and     purging said buffered data signals as modulated signals when said buffered data signals are other than said predetermined sequence of said escape characters.

14. A modem having an input and an output, said modem operative in a transmission mode in which communications signals are provided to a remote device through said output in response to data signals received at said input and operative in a command mode in which modem command instructions are implemented in response to data signals received at said input, said command mode being entered upon receipt at said input of a predetermined sequence of data signals, the modem comprising:

means for terminating said transmission mode upon an expiration of a predetermined time interval during which no said data signals are received at said input, thereby preventing transmission of said predetermined sequence to said remote device;

means for buffering said data signals received at said input following said termination of said transmission mode; and     means for subsequently establishing said command mode when said buffered data signals define a predetermined sequence of said data signals.

15. A modem according to claim 14 further comprising:

means for transmitting communications signals to said output in response to said buffered data signals when said buffered data signals are other than said predetermined sequence of said data signals.

16. Modem apparatus for operative coupling to a digital data device and to a telephone line and operating at least in a transmission mode in which to provide modulated signals to said line in response to data signals from said device, and in a command mode in which to respond to said data signals from said device as command instructions, said apparatus including timing means for detecting the elapse of a predetermined time interval in which no said data signals are received from said device, said apparatus comprising:

means for effecting a termination of said transmission mode in response to said elapse of said predetermined time interval;

buffer means for storing said data signals received following termination of said transmission mode; and     means for establishing said command mode when said stored data signals define a predetermined sequence of said data signals.

17. A modem apparatus of claim 16 further comprising:

means for purging said stored data signals as modulated signals when said stored data signals are other than said predetermined sequence of said data signals.

18. A modem apparatus of claim 16 wherein said predetermined sequence of said data signals comprises an escape sequence.

19. A modem apparatus of claim 16 wherein said predetermined sequence of data signals comprises a modem command prefix.

20. Modem apparatus operatively coupled to a digital data device and a telephone line and operating at least in a transmission mode in which to provide modulated signals to said line in response to data signals from said device, and in a command mode in which to respond to said data signals from said device as command instructions, said apparatus comprising:

data interface means for receiving said data signals from said device and for sending said data signals to said device;

modem engine means for providing modulated signals to said line from said data signals and for providing data signals to said device from modulated signals received from said line;

means for effecting a termination of said transmission mode upon elapse of a predetermined time interval in which no data signals are received from said device;

data buffer means for storing said data signals received upon the elapse of said predetermined time interval; and means for effecting said command mode when said stored data signals define a predetermined sequence of said data signals.

21. A modem apparatus of claim 20 further comprising:

means for purging said stored data signals to said modem engine means when said stored data signals do not define a predetermined sequence of said data signals.

22. A modem apparatus of claim 20 further comprising:

transmit switch means operative in first position to connect said data interface means to said modem engine means and in a second position to connect said buffer means to said modem engine means.

23. A modem apparatus of claim 20 further comprising:

receive switch means operative in a first position to connect said data interface means to said modem engine means and in a second position to connect said buffer means to said interface means.

* * * * *

UNITED STATES PATENT AND TRADEMARK OFFICE
CERTIFICATE OF CORRECTION

PATENT NO. : 5,295,156

DATED : March 15, 1994

INVENTOR(S) : Jerry Heep et al.

It is certified that error appears in the above-identified patent and that said Letters Patent is hereby corrected as shown below:

On title page, item [73] should be added to read as follows:

--AST Research, Inc.--

Column 4, line 21, "ma be" should be --may be--.

Column 8, line 14, "modem 1" should be --modem 10--.

Column 9, line 25, "they ar" should be --they are--.

Signed and Sealed this

Fifth Day of July, 1994

Attest:

BRUCE LEHMAN

Attesting Officer

Commissioner of Patents and Trademarks